United States Patent
Bhat et al.

(10) Patent No.: US 11,899,567 B2
(45) Date of Patent: *Feb. 13, 2024

(54) SYSTEM WITH HARDWARE REGISTER AND CONTROLLER EXTERNAL TO PROCESSOR THAT FACILITATES TRANSITIONS BETWEEN FIRMWARE IMAGES USING HARDWARE REGISTER WRITTEN WITH FIRMWARE IMAGE ENTRY POINTS

(71) Applicant: Cirrus Logic International Semiconductor Ltd., Edinburgh (GB)

(72) Inventors: Vivek T. Bhat, Austin, TX (US); Nariankadu D. Hemkumar, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 169 days.

This patent is subject to a terminal disclaimer.

(21) Appl. No.: 17/472,196

(22) Filed: Sep. 10, 2021

(65) Prior Publication Data

US 2023/0079673 A1 Mar. 16, 2023

(51) Int. Cl.
*G06F 11/36* (2006.01)
*G06F 9/445* (2018.01)
*G06F 9/30* (2018.01)

(52) U.S. Cl.
CPC ...... *G06F 11/3688* (2013.01); *G06F 9/30101* (2013.01); *G06F 9/44505* (2013.01); *G06F 11/3684* (2013.01); *G06F 11/3692* (2013.01)

(58) Field of Classification Search
CPC ............. G06F 11/3688; G06F 11/3692; G06F 9/44505; G06F 11/3684; G06F 9/30101
See application file for complete search history.

(56) References Cited

U.S. PATENT DOCUMENTS

| 2004/0049669 | A1* | 3/2004 | Schelling | G06F 9/44547 713/2 |
| 2007/0214349 | A1* | 9/2007 | Gu | G06F 1/3203 713/2 |
| 2011/0083042 | A1* | 4/2011 | Chang | G06F 11/2221 345/173 |
| 2013/0111457 | A1* | 5/2013 | Culter | G06F 8/65 717/171 |

(Continued)

*Primary Examiner* — Wei Y Zhen
*Assistant Examiner* — Brahim Bourzik
(74) *Attorney, Agent, or Firm* — E. Alan Davis; Huffman Law Group, PC (57) ABSTRACT

A system includes a memory programmed with multiple firmware images each having a distinct entry point, a processor, a writable hardware register initially seeded with an initial firmware image entry point address. A controller external to the processor, prior to an initial processor reset, reads the hardware register and causes the processor to begin fetching instructions at the initial firmware image entry point read from the hardware register. Prior to a subsequent reset, the external controller facilitates at least one transition to at least one of the multiple firmware images other than the initial firmware image by reading the entry point of the other firmware images from the hardware register and causing the processor to begin fetching instructions at the entry point of the other firmware images read from the hardware register.

38 Claims, 5 Drawing Sheets

(56) References Cited

U.S. PATENT DOCUMENTS

| | | | |
|---|---|---|---|
| 2014/0317395 A1* | 10/2014 | Luedeke | G06F 9/44505 |
| | | | 713/2 |
| 2014/0325197 A1* | 10/2014 | Lewis | G06F 9/4418 |
| | | | 713/2 |
| 2019/0370016 A1* | 12/2019 | Krishna | G06F 9/45504 |

* cited by examiner

SYSTEM WITH HARDWARE REGISTER AND CONTROLLER EXTERNAL TO PROCESSOR THAT FACILITATES TRANSITIONS BETWEEN FIRMWARE IMAGES USING HARDWARE REGISTER WRITTEN WITH FIRMWARE IMAGE ENTRY POINTS

BACKGROUND

The time and expense required to develop and test software is often significant. This situation may be particularly true in the case of software that provides low-level control for the hardware of a device, such as components of a smartphone, tablet, notebook, portable audio device, automobile, and so forth. This type of software is referred to by various names such as embedded software or firmware, among others. It may be particularly important to thoroughly test firmware and verify that it meets design requirements for various reasons. For example, the firmware may provide a mission-critical function. For another example, it may be more difficult to update the firmware to fix bugs than other software, such as application software or the operating system of a personal computer. This difficulty may be particularly true if the firmware is stored in a read-only memory (ROM) which may require physically replacing the ROM on the device.

For these reasons, firmware that has been thoroughly tested may be of great value and the ability to reuse it may enhance the value significantly. At the same time, it may often be necessary to add new features or functionality to the firmware of a device. However, introducing the new features, via new source code, may require the full testing of the new firmware—not only of the new functionality but also re-testing to verify that the earlier functionality was not broken by the introduction of the new functionality. This scenario may introduce significant additional test time and expense. Systems and methods are needed to preserve the prior investment in development and testing of the earlier firmware functionality to reduce firmware test time.

SUMMARY

In one embodiment, the present disclosure provides a system that includes a memory programmed with multiple firmware images. Each firmware image of the multiple firmware images has an associated entry point that is distinct from the entry point of the other firmware images. The system also includes a processor that fetches instructions of the multiple firmware images from the memory and executes the fetched instructions. The system also includes a hardware register writable with an address. The hardware register is initially seeded with an address that is the entry point of an initial firmware image among the multiple firmware images. The system also includes a controller that is external to the processor. The external controller is configured to, prior to an initial reset of the processor, read the entry point of the initial firmware image from the hardware register and cause the processor to begin fetching instructions at the entry point of the initial firmware image read from the hardware register. The external controller is also configured to, prior to at least one subsequent reset of the processor, facilitate at least one transition to at least one of the multiple firmware images other than the initial firmware image by reading the entry point of the at least one of the other firmware images from the hardware register and causing the processor to begin fetching instructions at the entry point of the at least one of the other firmware images read from the hardware register.

In another embodiment, the present disclosure provides a method performed in a system that includes a memory programmed with multiple firmware images in which each firmware image of the multiple firmware images has an associated entry point that is distinct from the entry point of the other firmware images, a processor, a hardware register writable with an address and a controller that is external to the processor. The method includes initially seeding the hardware register with an address that is the entry point of an initial firmware image among the multiple firmware images. The method also includes reading, by the external controller prior to an initial reset of the processor, the entry point of the initial firmware image from the hardware register and causing the processor to begin fetching and executing instructions at the entry point of the initial firmware image read from the hardware register. The method also includes facilitating, by the external controller prior to at least one subsequent reset of the processor, at least one transition to at least one of the multiple firmware images other than the initial firmware image by reading the entry point of the at least one of the other firmware images from the hardware register and causing the processor to begin fetching and executing instructions at the entry point of the at least one of the other firmware images read from the hardware register.

DETAILED DESCRIPTION

Figure 1:
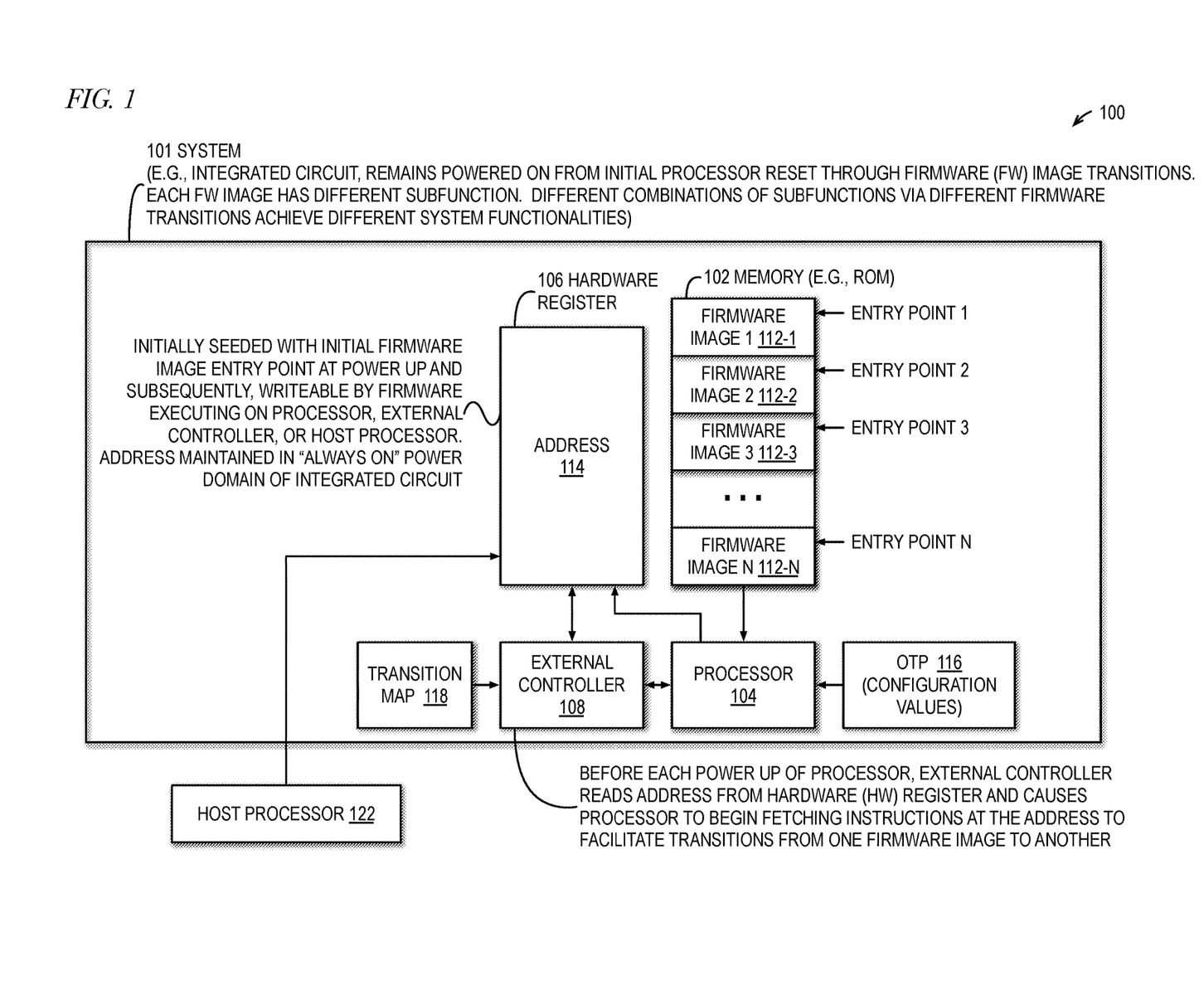
FIG. 1 is an example apparatus in accordance with embodiments of the present disclosure.

FIG. 1 is an example apparatus 100 in accordance with embodiments of the present disclosure. The apparatus 100 includes a system 101 and a host processor 122. The apparatus 100 may be any electronic apparatus such as, for example, a smartphone, portable audio device, camera, portable computing device such as a tablet or notebook or laptop, or self-driving vehicle component. The host processor 122 that communicates with and directs operation of the system 101. For example, the host processor 122 may be the main processor that executes the operating system of a smartphone, portable audio device, camera, portable computing device such as a tablet or notebook or laptop, or self-driving vehicle component.

The system 101 comprises a memory 102, a processor 104 that fetches instructions from the memory 102 and executes them, a hardware register 106 that holds an address 114, and a controller 108 that is external to the processor 104. Preferably, the external controller 108 holds the processor 104 in reset until the external controller 108 has read the address 114 from the hardware register 106 and provided it to the processor 104. The external controller 108 then releases the processor 104 from reset so that the processor 104 begins to fetch instructions from the memory 102 at the address 114 provided to the processor 104 by the external controller 108. The hardware register 106 may also be referred to as a boot-vector register. The hardware register 106 may be a flip-flop, random access memory (RAM) location, or other analogous circuit configured to retain its state when the system 101 is transitioned to a low-power inactive state of the system 101 (also referred to as a standby state, or dormant state) as described below.

The system 101 may be an integrated circuit. In one embodiment, the integrated circuit includes an "always on" power domain that keeps limited elements of the integrated circuit powered—such as the hardware register 106 to retain the current value of the address 114—even when other elements of the integrated circuit are powered down during a lower power inactive state of the system 101 to reduce power consumed by the integrated circuit. The system 101 may control one or more subsystems or sub-devices of the apparatus 100, such as a camera, haptic elements, audio transducers, video displays, and so forth.

The memory 102 may be a read-only memory (ROM), flash memory or other type of memory capable of storing program instructions fetchable and executable by the processor 104. The memory 102 is non-volatile, i.e., it retains its contents when powered off. In embodiments in which the memory 102 is read-only, a writable memory (e.g., RAM, not shown) may also be connected to the processor 104 to facilitate the reading and writing of data such as program variables and other data.

The memory 102 is programmed with multiple firmware images 112. In the embodiment of FIG. 1, N firmware images 112 are shown, denoted as firmware image 1 112-1, firmware image 2 112-2, firmware image 3 112-3, and firmware image N 112-N, and each of the firmware images 112 has an associated entry point, respectively denoted entry point 1, entry point 2, entry point 3, and entry point N. As shown in the embodiment of FIG. 1, the memory 102 is effectively partitioned such that the firmware images 112 reside completely within distinct respective address ranges within the memory 102. Each firmware image 112 programmed into the memory 102 is a self-contained executable image residing within its partition, i.e., within its distinct address range. Each partition of the memory 102 may be programmed from a file that is in an executable file format, e.g., an Executable and Link Format (ELF) or binary (bin) format, that includes the bytes of the associated firmware image 112. Embodiments of the process for generation of the firmware images 112 are described below, e.g., with respect to FIG. 5.

The entry point of each firmware image 112 is distinct from the entry point of the other firmware images 112. The entry point of a firmware image 112 is the address of the location in the memory 102 of the first instruction that, according to the design of the firmware image 112, the processor 104 is to fetch and execute. The processor 104 executes the firmware images 112 so that the system 101 may perform various subfunctions—such as system initialization processing, camera control processing, haptic processing, audio processing, video processing—to control the subsystems or sub-devices of the apparatus 100 to achieve the overall functionality of the system 101. That is, although each firmware image 112 is a self-contained executable image, the firmware images 112 individually do not provide the full system 101 functionally but instead each only provides a subfunction; whereas, in combination via transitions from the initial firmware image 112 to other firmware images 112 (and, in some embodiments, back to the initial firmware image 112) facilitated by the hardware register 106 and external controller 108, the full system 101 functionally is achieved.

The processor 104 may write the hardware register 106 with the address 114. That is, the processor 104 may execute instructions of the firmware images 112 that instruct the processor 104 to write the address 114 to the hardware register 106. The external controller 108 may also write the hardware register 106 with the address 114, e.g., with values read from a transition map, as described in more detail below. The host processor 122 may also write the hardware register 106 with the address 114, e.g., prior to the host processor 122 causing the system 101 to be reset or transition from a low-power inactive state to an active state. The "always on" power domain of the system 101 may also keep powered the logic needed for the host processor 122 and/or external controller 108 to write the hardware register 106 and for the external controller 108 to read a transition map 118, described in more detail below. Through a sequence of writes of different addresses 114 to the hardware register 106—namely different entry points of the firmware images 112—followed by resets of the processor 104, different transitions between different firmware images 112 are accomplished. Advantageously, different system 101 functionalities may be achieved via different sequences, or combinations, of writes of different addresses 114 (i.e., different entry points of the firmware images 112) to the hardware register 106 by the processor 104, external controller 108, and/or processor 104, as described in more detail below.

When the system 101 is initially powered on, e.g., when the apparatus 100 is powered on or the host processor 122 causes the system 101 to receive power, the hardware register 106 is initially seeded with an address 114 that is the entry point of an initial one of the firmware images 112, i.e., the firmware image 112 to be executed when the processor 104 comes out of its initial reset. The initial firmware image may be located at an arbitrary location within the memory. That is, the address 114 with which the hardware register 106 is initially seeded, i.e., the entry point of the initial firmware image 112, may be selected to be the address of any location within the memory 102 that contains the valid instruction to be fetched and executed by the processor 104 when it comes out of its initial reset. In one embodiment, a boot vector table is located at the first/lowest address in the initial firmware image 112, and the initially seeded address 114 of the hardware register 106 is a location within the address range of the initial firmware image 112 other than the boot vector table location, and the memory 102 is programmed at the initially seeded address 114 with a branch instruction that branches to the first entry in the boot vector table. The memory 102 may be programmed similarly for other firmware images 112.

The firmware images 112 may be programmed to instruct the external controller 108 to place the system 101 in a low-power inactive state. The host processor 122 may also place the system 101 in a low-power inactive state. As described above, the system 101 is subsequently transitioned from the low-power inactive state to the active state, and the external controller 108 reads the address 114 from the hardware register 106—which remains powered by the "always on" power domain of the system 101 during the low-power inactive state to retain the address 114—and causes the processor 104 to come out of reset and begin fetching instructions at the address 114 read from the hardware register 106. Thus, at least a portion of the system 101 remains powered on from the initial reset of the processor 104 throughout the various firmware image 112 transitions to accomplish the overall system 101 functionality achieved by the combination of firmware image 112 subfunctions. When the processor 104 is executing a firmware image 112, the system 101 may be referred to as being in a functional state. When the system 101 is in a low-power inactive state—e.g., the processor 104 is powered off and not executing instructions—the system 101 may be referred to as being in a dormant state. In this manner, the system 101 may transition from the initial functional state (i.e., execution of the initial firmware image 112) to a second functional state (i.e., execution of a second firmware image 112) and possibly to a third functional state and so forth, preferably through dormant state transitions, advantageously without power cycling the entire system 101, to achieve the full system 101 functionality that is not provided individually by any one of the subfunctions of the firmware images 112 alone, i.e., not provided individually by any one of the functional states alone.

The system 101 may also include a one-time programmable memory (OTP) 116 readable by the processor 104. The OTP 116 may hold configuration values that the processor 104 reads, e.g., during execution of the initial firmware image 112, and uses to configure the system 101. For example, the configuration values may include firmware patches and trim values that are applied to various components, e.g., to calibrate resistor/capacitor values that need to match precisely. The system 101 may also include the transition map 118. In one embodiment, the transition map 118 is stored in the memory 102 or in the OTP 116 or in another memory readable by the external controller 108. The transition map 118 specifies an ordered sequence of entry points associated with two or more of the firmware images 112 that the external controller 108 may read and then write to the hardware register 106 to facilitate transitions between the firmware images 112, as described in more detail below.

Embodiments are contemplated in which the system 101 includes multiple processors 104, each having a respective hardware register 106, and upon power up of each of the processors 104, the external controller 108 reads the hardware registers 106 and causes the processors 104 to begin fetching instructions at the respective addresses 114 read from the respective hardware registers 106.

Figure 2:
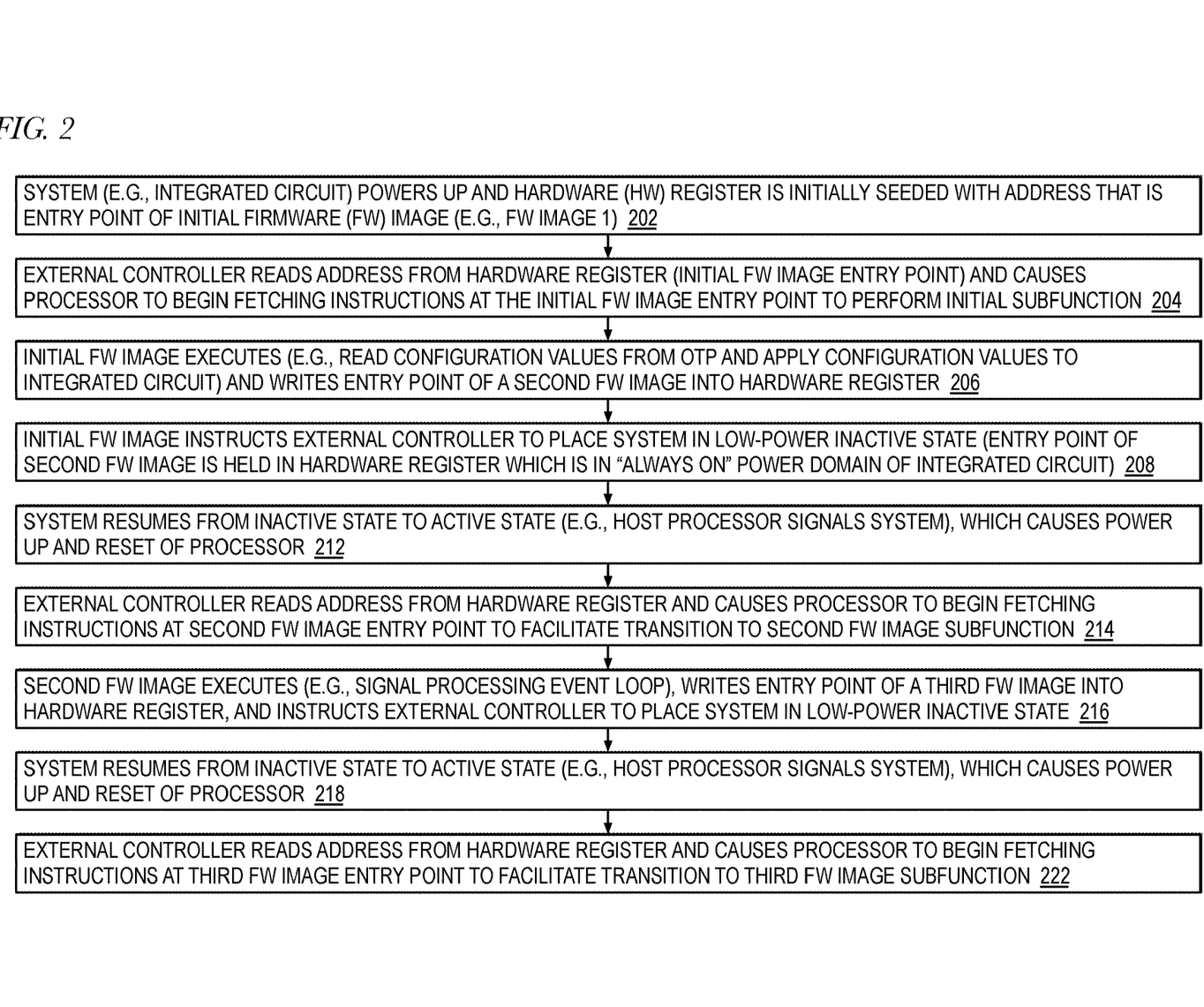
FIG. 2 is an example flowchart illustrating operation of the apparatus of FIG. 1 in accordance with embodiments of the present disclosure.

FIG. 2 is an example flowchart illustrating operation of the apparatus 100 of FIG. 1 in accordance with embodiments of the present disclosure. Operation begins at block 202.

At block 202, the system 101 goes from a fully unpowered state to a powered-up state (e.g., at power up of the apparatus 100 or by control of the host processor 122). In response to being powered up, the hardware register 106 is initially seeded with an address 114 that is the entry point of the initial firmware image 112, i.e., one of the firmware images 112 stored in the memory 102. Operation proceeds to block 204.

At block 204, the external controller 108 reads the address 114 from the hardware register 106, which is the initial firmware image 112 entry point, and causes the processor 104 to begin fetching instructions at the initial firmware image 112 entry point. As described above, the external controller 108 may hold the processor 104 in reset, write the address 114 read from the hardware register 106 to the processor 104 (e.g., a register of the processor 104), and then release the processor 104 from reset. The processor 104 is configured to, when released from reset, read the address written by the external controller 108 and fetch its first instruction from the address. Operation proceeds to block 206.

At block 206, the initial firmware image 112 executes to perform an initial subfunction, i.e., the subfunction of the initial firmware image 112. In one embodiment, a portion of the subfunction of the initial firmware image 112 is to read the configuration values from the OTP 116 and configure the system 101 with them. Subsequently, the initial firmware image 112 writes the hardware register 106 with the entry point of a second firmware image 112, e.g., firmware image N 112-N. Operation proceeds to block 208.

At block 208, the initial firmware image 112 instructs the external controller 108 to place the system 101 into a low-power inactive state. As described above, even during the low-power inactive state, the address 114 most recently written into the hardware register 106 is maintained because the hardware register 106 (and any other needed logic) is kept powered by the "always on" power domain of the integrated circuit 101. Operation proceeds to block 212.

At block 212, the system 101 resumes from the low-power inactive state to the active state (i.e., the system 101 is fully powered), which causes the processor 104 to be powered up and held in reset by the external controller 108. In one embodiment, the system 101 may resume to the active state in response to a signal from the host processor 122. Operation proceeds to block 214.

At block 214, the external controller 108 reads the address 114 from the hardware register 106 and causes the processor 104 to begin fetching instructions at the address 114, which is the entry point of the second firmware image 112 that was written by the initial firmware image 112 at block 206. Operation proceeds to block 216.

At block 216, the second firmware image 112 executes to perform a second subfunction, i.e., the subfunction of the second firmware image 112. In one embodiment, a portion of the subfunction of the second firmware image 112 is to perform a signal processing event loop for camera control processing, an example of which is described in U.S. patent application Ser. No. 17/320,528 filed May 14, 2021, which is hereby incorporated by reference in its entirety for all purposes. Subsequently, the second firmware image 112 writes the hardware register 106 with the entry point of a third firmware image 112, e.g., firmware image 3 112-3. The second firmware image 112 then instructs the external controller 108 to place the system 101 into a low-power inactive state, or alternatively the host processor 122 causes the system 101 to enter the low-power inactive state. Operation proceeds to block 218.

At block 218, the system 101 resumes from the low-power inactive state to the active state, which causes the processor 104 to be powered up and held in reset by the external controller 108. Operation proceeds to block 222.

At block 222, the external controller 108 reads the address 114 from the hardware register 106 and causes the processor 104 to begin fetching instructions at the address 114, which is the entry point of the third firmware image 112 that was written by the second firmware image 112 at block 216. Other transitions similar to those performed above from the initial firmware image 112 to the second firmware image 112 and from the second firmware image 112 to the third firmware image 112 may also be performed in order to execute the desired combination of subfunctions to achieve the desired functionality of the system 101.

Advantageously, because each transition to a firmware image 112 enjoys the benefit of executing on a fresh state of the processor 104 because the firmware image 112 is executed after a reset of the processor 104, the functionality of the firmware image 112 is not affected by the state in which any previous execution of a firmware image 112 may have left the processor 104. For example, artifacts in memory or the internal state of the processor 104 that may have been left by the previous firmware image 112 are cleared by the reset of the processor 104 during the transition to the new firmware image 112 such that the new firmware image 112 executes from a clean state. This clearing and reset may facilitate a savings in development and/or testing cost associated with a new revision of the memory 102. Furthermore, the split, or partitioned, nature of the firmware images 112 and the multi-state transitions (also referred to as multi-stage boot process) may have the advantage of facilitating parallel development and testing of the different firmware images 112, as described in more detail below, particularly with respect to FIG. 5.

Figure 3:
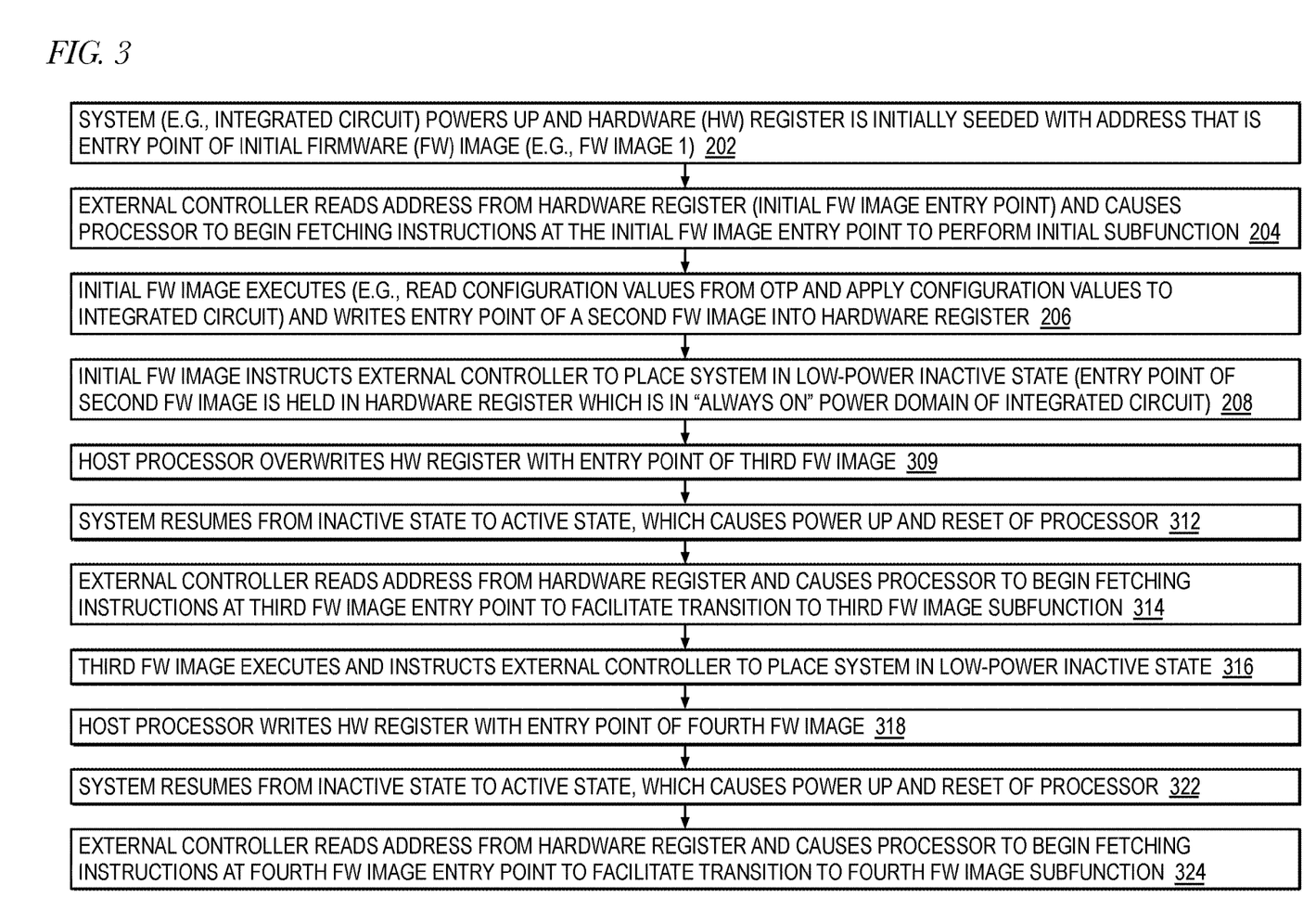
FIG. 3 is an example flowchart illustrating operation of the apparatus of FIG. 1 in accordance with embodiments of the present disclosure.

FIG. 3 is an example flowchart illustrating operation of the apparatus 100 of FIG. 1 in accordance with embodiments of the present disclosure. Operation begins at block 202 and proceeds through block 208 as described above with respect to FIG. 2. Advantageously, the subfunction of the initial firmware image 112 may be tested and then reused through transitions to different firmware images 112, i.e., according to the multi-boot process described herein, which may reduce testing time and expense. Operation proceeds from block 208 to block 309.

At block 309, the host processor 122 overwrites the hardware register 106 with the entry point of a third firmware image 112, e.g., firmware image 4 112-4. Operation proceeds to block 312.

At block 312, the system 101 resumes from the low-power inactive state to the active state, which causes the processor 104 to be powered up and held in reset by the external controller 108. Operation proceeds to block 314.

At block 314, the external controller 108 reads the address 114 from the hardware register 106 and causes the processor 104 to begin fetching instructions at the address 114, which is the entry point of the third firmware image 112 that was written by the host processor 122 at block 309. Operation proceeds to block 316.

At block 316, the third firmware image 112 executes to perform a third subfunction, i.e., the subfunction of the third firmware image 112. Subsequently, the third firmware image 112 instructs the external controller 108 to place the system 101 into a low-power inactive state, or alternatively the host processor 122 causes the system 101 to enter the low-power inactive state. In one embodiment, the third firmware image 112 writes the hardware register 106 with a firmware image 112 entry point prior to instructing the external controller 108 to place the system 101 into a low-power inactive state. Operation proceeds to block 318.

At block 318, the host processor 122 overwrites the hardware register 106 with the entry point of a fourth firmware image 112, e.g., firmware image 5 112-5. Operation proceeds to block 322.

At block 322, the system 101 resumes from the low-power inactive state to the active state, which causes the processor 104 to be powered up and held in reset by the external controller 108. Operation proceeds to block 324.

At block 324, the external controller 108 reads the address 114 from the hardware register 106 and causes the processor 104 to begin fetching instructions at the address 114, which is the entry point of the fourth firmware image 112 that was written by the host processor 122 at block 318. Other transitions similar to those performed above from the initial firmware image 112 to the third firmware image 112 and from the third firmware image 112 to the fourth firmware image 112 may also be performed in order to execute each of the desired subfunctions to achieve the full functionality of the system 101. Additionally, transitions achieved by one or more writes of the hardware register 106 by the host processor 122 may be combined with transitions achieved by one or more writes of the hardware register 106 by the processor 104 while executing a previously executing firmware image 112, as described with respect to FIG. 2.

Figure 4:
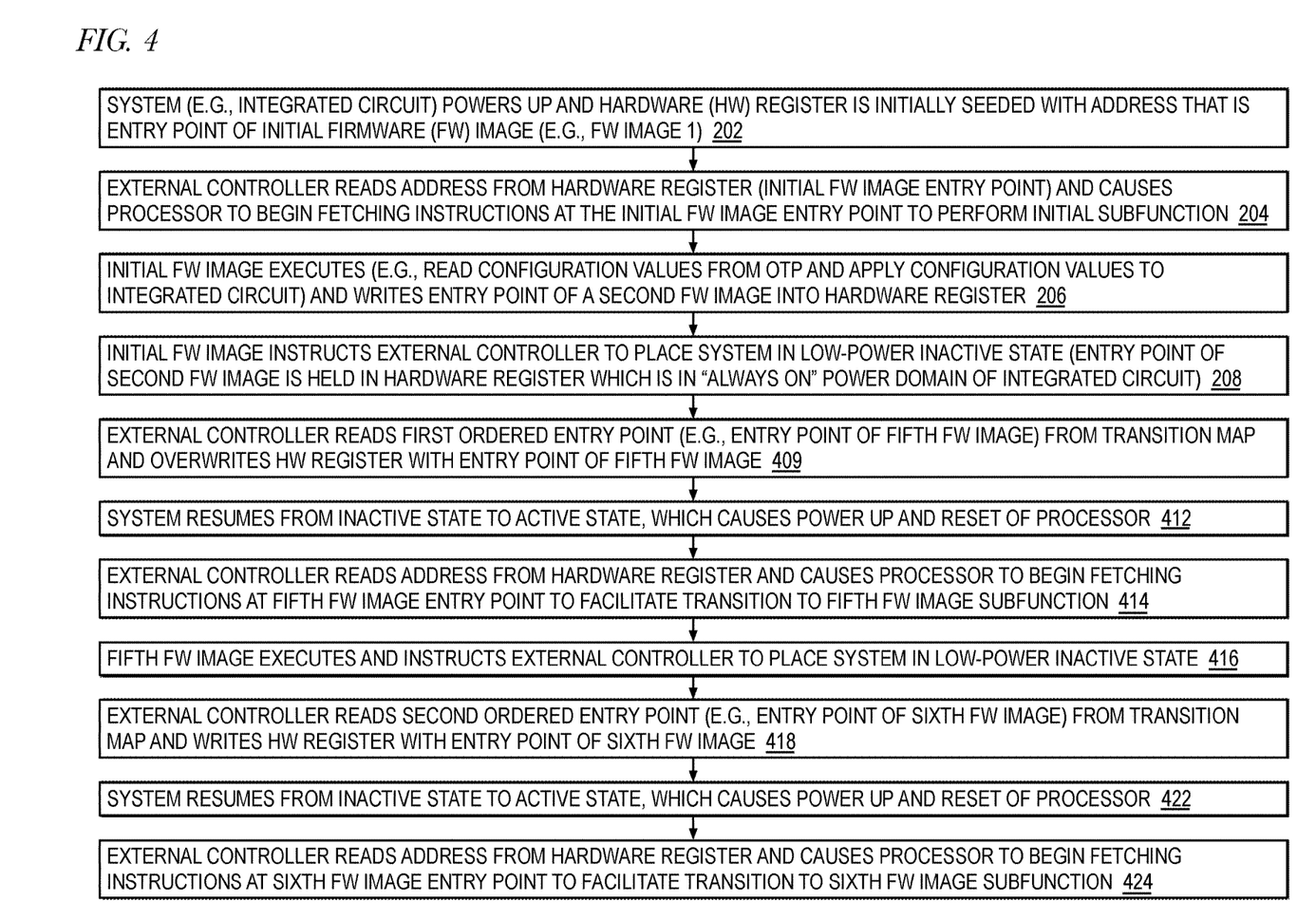
FIG. 4 is an example flowchart illustrating operation of the apparatus of FIG. 1 in accordance with embodiments of the present disclosure.

FIG. 4 is an example flowchart illustrating operation of the apparatus 100 of FIG. 1 in accordance with embodiments of the present disclosure. Operation begins at block 202 and proceeds through block 208 as described above with respect to FIG. 2. Operation proceeds from block 208 to block 409. In the example, the transition map 118 has been programmed (e.g., in the OTP 116) such that the first entry in its ordered sequence of entry points is the entry point of a fifth firmware image 112, e.g., firmware image 6 112-6, and the second entry in its ordered sequence of entry points is the entry point of a sixth firmware image 112, e.g., firmware image 2 112-2.

At block 409, the external controller 108 reads a first entry point in an ordered sequence of entry points from the transition map 118 of FIG. 1 and overwrites the hardware register 106 with the entry point of a fifth firmware image 112, e.g., firmware image 6 112-6. Operation proceeds to block 412.

At block 412, the system 101 resumes from the low-power inactive state to the active state, which causes the processor 104 to be powered up and held in reset by the external controller 108. Operation proceeds to block 414.

At block 414, the external controller 108 reads the address 114 from the hardware register 106 and causes the processor 104 to begin fetching instructions at the address 114, which is the entry point of the fifth firmware image 112 that was written by the external controller 108 at block 409. Operation proceeds to block 416.

At block 416, the fifth firmware image 112 executes to perform a fifth subfunction, i.e., the subfunction of the fifth firmware image 112. Subsequently, the fifth firmware image 112 instructs the external controller 108 to place the system 101 into a low-power inactive state, or alternatively the host processor 122 causes the system 101 to enter the low-power inactive state. In one embodiment, the fifth firmware image 112 writes the hardware register 106 with a firmware image 112 entry point prior to instructing the external controller 108 to place the system 101 into a low-power inactive state. Operation proceeds to block 418.

At block 418, the external controller 108 reads a next, i.e., second, entry point in the ordered sequence of entry points from the transition map 118 and overwrites the hardware register 106 with the entry point of a sixth firmware image 112, e.g., firmware image 2 112-2. Operation proceeds to block 422.

At block 422, the system 101 resumes from the low-power inactive state to the active state, which causes the processor 104 to be powered up and held in reset by the external controller 108. Operation proceeds to block 424.

At block 424, the external controller 108 reads the address 114 from the hardware register 106 and causes the processor 104 to begin fetching instructions at the address 114, which is the entry point of the sixth firmware image 112 that was written by the external controller 108 at block 418. Other transitions similar to those performed above from the initial firmware image 112 to the fifth firmware image 112 and from the fifth firmware image 112 to the sixth firmware image 112 may also be performed in order to execute each of the desired subfunctions to achieve the full functionality of the system 101. Additionally, transitions achieved by one or more writes of the hardware register 106 by the external controller 108 may be combined with transitions achieved by one or more writes of the hardware register 106 by the host processor 122, as described with respect to FIG. 3, and may be combined with transitions achieved by one or more writes of the hardware register 106 by the processor 104 while executing a previously executed firmware image 112, as described with respect to FIG. 2. That is, firmware image 112 transitions may be achieved by writes to the hardware register 106 by different combinations of the host processor 122, external controller 108, and processor 104.

In other embodiments of FIGS. 2, 3 and/or 4, a transition from a current firmware image 112 to a previous firmware image 112 may occur, e.g., a transition from the current firmware image 112 back to the initial firmware image 112 may occur. Furthermore, in other embodiments of FIGS. 2, 3 and/or 4, a transition from a current firmware image 112 to the same firmware image 112 may occur. For example, with respect to FIG. 2, at block 216, the second firmware image 112 may not overwrite the hardware register 106 with the entry point of a third firmware image 112 but instead simply leave its own entry point in the hardware register 106 or may re-write the hardware register 106 with its own entry point. As a result, when the system 101 resumes from the inactive state to the active state at block 218, the external controller 108 reads the entry point of the second firmware image 112 from the hardware register 106 and again causes the processor to begin fetching instructions at the second firmware image 112 as at block 214. In this manner, the second firmware image 112 continues to operate, e.g., to perform a signal processing subfunction, and the benefit of reduced power consumption is enjoyed while the signal processing subfunction is not needed, i.e., while in the inactive state.

Figure 5:
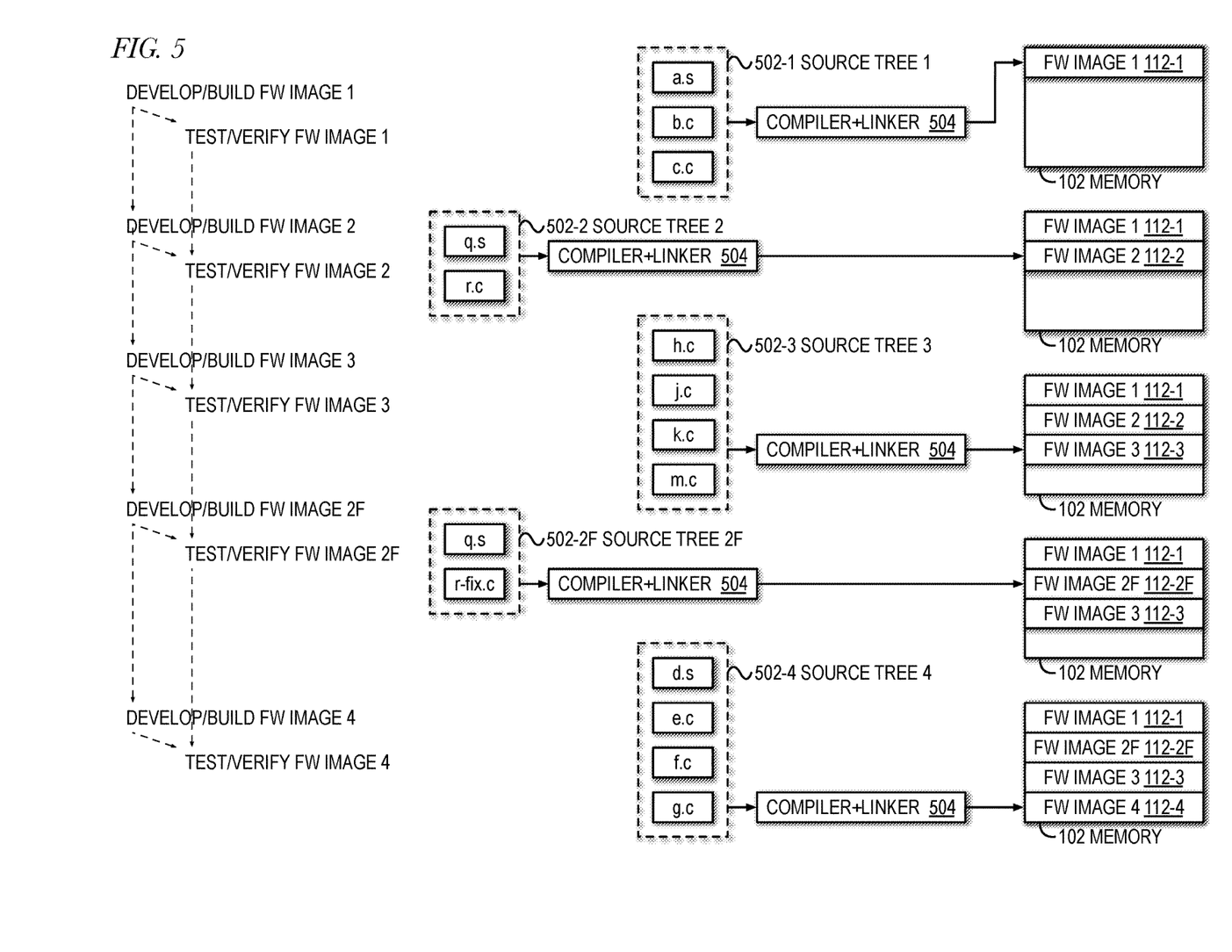
FIG. 5 is an example block diagram illustrating a method for creating and testing the firmware images of FIG. 1 in accordance with embodiments of the present disclosure.

FIG. 5 is an example block diagram illustrating a method for creating and testing the firmware images 112 of FIG. 1 in accordance with embodiments of the present disclosure. FIG. 5 illustrates multiple different states of the memory 102 of FIG. 1 during the course of development and testing of the firmware images 112. Five different firmware images 112 are shown denoted firmware image 1 112-1, firmware image 2 112-2, firmware image 3 112-3, firmware image 2F 112-2F, and firmware image 4 112-4, which are built using source tree 1 502-1, source tree 2 502-2, source tree 3 502-3, source tree 2F 502-2F, and source tree 3 502-3, respectively, each of which are different. Various example filenames (e.g., assembly language and C language files) are shown in each source tree 502. There may be some overlap such that some source files may be included in multiple source trees 502.

Firmware developers develop the source files of the source tree 502. Development tools, such as a compiler and linker 504 are used to build a source tree 502 into its respective firmware image 112. Preferably, each firmware image 112 is generated as a self-contained executable file that may include a vector table, headers, code and data sections, a version number, and a CRC of the firmware image 112. Once a firmware image 112 is built, it is programmed, or "burned," into the memory 102. The firmware image 112 may be tested/verified and iterated upon by updating the source files, re-building, programming the memory 102, and testing until the firmware image 112 is verified (e.g., by a verification group) to perform according to its specifications. Variations of the development/build and testing/verification steps may be performed with respect to the personnel that perform them. In the example of FIG. 5, different steps of the process for the different firmware images 112 are shown. Generally, time may be viewed as flowing downward in FIG. 5, and some of the steps may overlap.

Initially, firmware image 1 112-1 is developed/built and then tested/verified after which the state of the memory 102 includes firmware image 1 112-1. Subsequently, firmware image 2 112-2 may be developed/built and then tested/verified, after which the state of the memory 102 includes firmware image 1 112-1 and firmware image 2 112-2. Similar steps are performed for firmware image 3 112-3 after which the state of the memory 102 includes firmware image 1 112-1, firmware image 2 112-2, and firmware image 3 112-3. Similar steps are performed for firmware image 2F 112-2F after which the state of the memory 102 includes firmware image 1 112-1, firmware image 2F 112-2F, and firmware image 3 112-3. This image inclusion is because firmware image 2F 112-2F replaces firmware image 2 112-2 in the memory 102 because firmware image 2F 112-2F was built to replace firmware image 2 112-2, for example because a bug in a source file of the source tree 2 502-2 was fixed in source tree 2F 502-2F. Similar steps are performed for firmware image 4 112-4 after which the state of the memory 102 includes firmware image 1 112-1, firmware image 2F 112-2F, firmware image 3 112-3, and firmware image 4 112-4. The example of FIG. 5 is provided for illustration, and other numbers and combinations of firmware images 112 may be developed, built, tested and verified.

Generally speaking, the steps associated with the various firmware images 112 may be performed concurrently in part and sequentially in part. For example, development of multiple source trees 502 may be performed concurrently and with the concurrent test/verification of multiple firmware images 112. Thus, advantageously, the full system 101 functionality may be divided into multiple components, i.e., the multiple firmware images 112, that each performs a subfunction that may be reusable according to different subfunction combinations. Although each firmware image 112 performs a subfunction of the full functionality of the system 101, each firmware image 112 is a self-contained entity and may be separately booted and tested independently from the other firmware images 112, which may advantageously facilitate concurrent development and/or testing/verification of the different firmware images 112 to reduce time to market and/or increase the robustness of the firmware images 112 relative to a memory 102 programmed with a single monolithic firmware image 112 that performs all the subfunctions needed to achieve the full system 101 functionality. Although each firmware image 112 is self-contained, advantageously as described above, multiple firmware images 112 may be effectively linked together through the agency of the hardware register 106 and external controller 108 that operate to effectively bridge a hardware-firmware boundary to enable transition of execution of the processor 104 to a next firmware image 112 entry point that was previously written to the hardware register 106 and maintained therein by the "always on" power domain of the system 101.

Described herein are embodiments of a system having a processor and an external controller, distinct functional states (e.g., execution of firmware images 112 by the processor 104) including an initial functional state and a non-functional dormant state (e.g., low-power inactive state). The system also includes a memory store to house, in a well-partitioned manner, programmed/pre-determined behaviors (e.g., subfunctions of firmware images) in functional states. The system achieves arbitrary transitions into and between the functional states, potentially through a dormant state, as determined by a controller external to the processor and facilitated by a boot-vector register (e.g., hardware register 106) seeded with an initial value (pointer/ address) to ensure commencement in the initial state by the external controller. The next value (pointer/address) of the boot-vector register is statically or dynamically determined and updated. The boot-vector register may be updated by a precedent functional state (e.g., upon the current functional state communicating its end to the external controller) to point to and facilitate eventual transition into the next functional state. The boot-vector register may also or alternatively be updated by the external controller itself, e.g., according to a transition map with an ordered sequence of entry points. The boot-vector register may also or alternatively be updated by a host processor external to the system.

Also described herein are embodiments of a method of systematically partitioning/re-partitioning a memory store to house programmed/pre-determined behaviors in functional states of the system so as to allow for the independent evolution of behaviors in the functional states including additions, modifications and/or deletions of behaviors within each state and additions of new and/or deletions of extant functional states with the concomitant benefit of accrual and retention of technical assets arising from prior testing and verification of the behaviors in unmodified functional states leading to non-recurrence of technical debt for the same.

Also described herein are embodiments of a method of constructing and maintaining a forest of source trees to define programmed/pre-determined behaviors in functional states of the system and related ancillary information, including a transition map, to facilitate the realization of the systematic partitioning/re-partitioning method. Transitions into and between the states is facilitated by the boot-vector register in the system. The method supports the independent evolution of codified behaviors in the system to accrue and retain the benefits described above.

Also described herein are embodiments in which the memory store may be wholly or in part realized in a non-mutable/non-volatile manner and thereby early and extensive testing and verification of behaviors of functional states included in the desirable and beneficial partial realization is facilitated.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, unless otherwise indicated, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure refers to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments, likewise, with the benefit of this disclosure, will be apparent to those having ordinary skill in the art, and such embodiments should be deemed as being encompassed herein. All examples and conditional language recited herein are intended for pedagogical objects to aid the reader in understanding the disclosure and the concepts contributed by the inventor to furthering the art and are construed as being without limitation to such specifically recited examples and conditions.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Finally, software can cause or configure the function, fabrication and/or description of the apparatus and methods described herein. This can be accomplished using general programming languages (e.g., C, C++), hardware description languages (HDL) including Verilog HDL, VHDL, and so on, or other available programs. Such software can be disposed in any known non-transitory computer-readable medium, such as magnetic tape, semiconductor, magnetic disk, or optical disc (e.g., CD-ROM, DVD-ROM, etc.), a network, wire line or another communications medium, having instructions stored thereon that are capable of causing or configuring the apparatus and methods described herein.

The invention claimed is:

1. A system comprising:
   a memory programmed with multiple firmware images, wherein each firmware image of the multiple firmware images has an associated entry point that is distinct from the entry point of the other firmware images;
   a processor that fetches instructions of the multiple firmware images from the memory and executes the fetched instructions;
   a hardware register writable with an address, wherein the hardware register is initially seeded with an address that is an initial entry point of an initial firmware image among the multiple firmware images; and
   a controller that is external to the processor and that is configured to:
      hold the processor in an initial reset, read the initial entry point from the hardware register, write the initial entry point to the processor, and release the processor from the initial reset to cause the processor to fetch its first instruction out of the initial reset from the memory at the initial entry point read from the hardware register;
   wherein, after the external controller reads the initial entry point, the hardware register is writable with a second entry point of a second firmware image among the multiple firmware images other than the initial firmware image;
   wherein to facilitate a transition from running the initial firmware image to the second firmware image, the external controller is further configured to:

hold the processor in a second reset subsequent to the initial reset, read the second entry point from the hardware register, write the second entry point to the processor, and release the processor from the second reset to cause the processor to fetch its first instruction out of the second reset from the memory at the second entry point read from the hardware register.

2. The system of claim 1,
wherein at least a portion of the system is configured to remain powered on from the initial reset of the processor to the at least one subsequent second reset of the processor and through the at least one transition to the second firmware image.

3. The system of claim 1,
wherein the multiple firmware images comprise at least three firmware images;
wherein each of the at least three firmware images performs a different subfunction of the system; and
wherein multiple different system functionalities are achievable by different combinations of transitions from the initial firmware image to the at least three firmware images.

4. The system of claim 1,
wherein the entry point of the initial firmware image is locatable at an arbitrary location within the memory.

5. The system of claim 1,
wherein the address with which the hardware register is initially seeded is an address which the hardware register holds upon being powered up.

6. The system of claim 1,
wherein the hardware register is writable by the processor while executing a firmware image of the multiple firmware images.

7. The system of claim 1,
wherein one or more of the firmware images is programmed to instruct the external controller to place the system in a low-power inactive state; and
wherein at least one of the second reset or a subsequent reset of the processor occurs when the processor is transitioned from the low-power inactive state to an active state.

8. The system of claim 1,
wherein the hardware register is writable by the external controller.

9. The system of claim 8,
a transition map that specifies an ordered sequence of two or more of the entry points associated with the multiple firmware images; and
wherein the external controller is configured to, prior to each of the second reset and at least one subsequent reset of the processor, read a next ordered entry point of the ordered sequence of two or more entry points from the transition map and update the hardware register with the next ordered entry point.

10. The system of claim 9,
wherein the transition map is programmed into a one-time programmable (OTP) memory of an integrated circuit within which the system is located.

11. The system of claim 9,
wherein each of the two or more of the entry points is locatable at a respective arbitrary location within the memory.

12. The system of claim 1,
wherein an integrated circuit comprises the processor, the hardware register, and the external controller.

13. The system of claim 12,
wherein the hardware register is writable by a processor external to the integrated circuit.

14. The system of claim 12,
wherein the hardware register is located within a power domain of the integrated circuit that remains powered on to preserve the address stored the hardware register even when the processor is powered down.

15. The system of claim 12,
wherein the initial firmware image is programmed to read configuration values from a one-time programmable (OTP) memory of the integrated circuit and to apply the configuration values to the integrated circuit.

16. The system of claim 1,
wherein the multiple firmware images reside completely within distinct respective address ranges within the memory.

17. The system of claim 1,
wherein each firmware image of the multiple firmware images is built using a different firmware source code tree.

18. The system of claim 1,
wherein each firmware image of the multiple firmware images is separately testable independent of the other multiple firmware images.

19. The system of claim 1,
wherein the memory is a read-only memory.

20. A method, comprising:
in a system comprising:
  a memory programmed with multiple firmware images, wherein each firmware image of the multiple firmware images has an associated entry point that is distinct from the entry point of the other firmware images;
  a processor;
  a hardware register writable with an address; and
  a controller that is external to the processor;
initially seeding the hardware register with an address that is an initial entry point of an initial firmware image among the multiple firmware images;
by the external controller: holding the processor in an initial reset, reading, the initial entry point from the hardware register, writing the initial entry point to the processor, and causing the processor to fetch its first instruction out of the initial reset from the memory at the initial entry point read from the hardware register;
after the external controller reads the initial entry point, writing the hardware register with a second entry point of a second firmware image among the multiple firmware images other than the initial firmware image;
to facilitate a transition from running the initial firmware image to the second firmware image, by the external controller:
holding the processor in a second reset subsequent to the initial reset, reading the second entry point from the hardware register, writing the second entry point to the processor, and releasing the processor from the second reset to cause the processor to fetch its first instruction out of the second reset from the memory at the second entry point read from the hardware register.

21. The method of claim 20, further comprising:
keeping at least a portion of the system powered on from the initial reset of the processor to the second reset of the processor and through the transition to the second firmware image.

22. The method of claim 20, further comprising:
wherein the multiple firmware images comprise at least three firmware images;

wherein each of the at least three firmware images is programmed to perform a different subfunction of the system; and achieving multiple different system functionalities by different combinations of transitions from the initial firmware image to the at least three firmware images.

23. The method of claim 20, locating the entry point of the initial firmware image at an arbitrary location within the memory.

24. The method of claim 20, wherein the address with which the hardware register is initially seeded is an address which the hardware register holds upon being powered up.

25. The method of claim 20, further comprising:

writing, by the processor, the hardware register while executing a firmware image of the multiple firmware images.

26. The method of claim 20, further comprising:

instructing, by one or more of the firmware images, the external controller to place the system in a low-power inactive state; and transitioning the processor from the low-power inactive state to an active state to perform at least one of the second reset or a subsequent reset of the processor.

27. The method of claim 20, writing, by the external controller, the hardware register.

28. The method of claim 27, further comprising:

wherein the system further comprises a transition map that specifies an ordered sequence of two or more of the entry points associated with the multiple firmware images; and reading, by the external controller prior to each of the second reset and at least one subsequent reset of the processor, a next ordered entry point of the ordered sequence of two or more entry points from the transition map and updating the hardware register with the next ordered entry point.

29. The method of claim 28, wherein the transition map is programmed into a one-time programmable (OTP) memory of an integrated circuit within which the system is located.

30. The method of claim 28, wherein each of the two or more of the entry points is locatable at a respective arbitrary location within the memory.

31. The method of claim 20, wherein an integrated circuit comprises the processor, the hardware register, and the external controller.

32. The method of claim 31, further comprising:

writing, by a processor external to the integrated circuit, the hardware register.

33. The method of claim 31, wherein the hardware register is located within a power domain of the integrated circuit that remains powered on to preserve the address stored the hardware register even when the processor is powered down.

34. The method of claim 31, further comprising:

reading, by the initial firmware image, configuration values from a one-time programmable (OTP) memory of the integrated circuit and applying the configuration values to the integrated circuit.

35. The method of claim 20, further comprising:

programming the multiple firmware images to reside completely within distinct respective address ranges within the memory.

36. The method of claim 20, further comprising:

building each firmware image of the multiple firmware images using a different firmware source code tree.

37. The method of claim 20, further comprising:

separately testing each firmware image of the multiple firmware images independent of the other multiple firmware images.

38. The method of claim 20, wherein the memory is a read-only memory.

\* \* \* \* \*

UNITED STATES PATENT AND TRADEMARK OFFICE
CERTIFICATE OF CORRECTION

PATENT NO. : 11,899,567 B2
APPLICATION NO. : 17/472196
DATED : February 13, 2024
INVENTOR(S) : Vivek T. Bhat and Nariankadu D. Hemkumar It is certified that error appears in the above-identified patent and that said Letters Patent is hereby corrected as shown below:

In the Claims

1. In Column 13, Line 12, in Claim 2, delete "the at least one subsequent" and insert -- the --, therefor.

2. In Column 13, Line 13, in Claim 2, delete "the at least one" and insert -- the --, therefor.

3. In Column 14, Line 7, in Claim 14, delete "stored" and insert -- stored in --, therefor.

4. In Column 16, Line 17, in Claim 33, delete "stored" and insert -- stored in --, therefor.

Signed and Sealed this
Second Day of April, 2024

Katherine Kelly Vidal
*Director of the United States Patent and Trademark Office*